(12) United States Patent
Stephan et al.

(10) Patent No.: US 12,294,633 B2
(45) Date of Patent: May 6, 2025

(54) METHOD FOR CONTROLLING ACCESS TO CONTENT IMPLEMENTED BY A CACHE SERVER

(71) Applicant: Orange, Issy-les-Moulineaux (FR)

(72) Inventors: Emile Stephan, Chatillon (FR); Frédéric Fieau, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/003,310

(22) PCT Filed: Jun. 23, 2021

(86) PCT No.: PCT/FR2021/051153
§ 371 (c)(1),
(2) Date: Dec. 23, 2022

(87) PCT Pub. No.: WO2021/260327
PCT Pub. Date: Dec. 30, 2021

(65) Prior Publication Data
US 2023/0247110 A1    Aug. 3, 2023

(30) Foreign Application Priority Data
Jun. 26, 2020   (FR) .................................... 2006709

(51) Int. Cl.
*H04L 67/568*    (2022.01)
*H04L 9/40*      (2022.01)
(52) U.S. Cl.
CPC ............ *H04L 67/568* (2022.05); *H04L 63/10* (2013.01)
(58) Field of Classification Search
CPC ...... H04L 67/568; H04L 63/10; H04L 63/108
See application file for complete search history.

(56) References Cited

U.S. PATENT DOCUMENTS 8,504,655 B1 * 8/2013 Bertz .................... H04L 63/104
                                                 709/219
9,210,177 B1 * 12/2015 Hughes .................. H04L 63/10
(Continued)

FOREIGN PATENT DOCUMENTS

WO    WO 2007/111588 A1    10/2007

OTHER PUBLICATIONS

Peterson Akamai Technologies L et al., "Framework for Content Distribution Network Interconnection (CDNI); rfc7336.txt", Framework for Content Distribution Network Interconnection (CDNI); RFC7336.TXT, Internet Engineering Task Force, IETF; Standard, Internet Society (ISOC) 4, Rue Des Falaises Ch-1205 Geneva, Switzerland, Aug. 13, 2014, pp. 1-58, XP015104428, sections "3.7. Pre-positioned Content Acquisition Example" et 3.8 Asynchronous CDNI Metadata Example.

(Continued)

*Primary Examiner* — Schquita D Goodwin
*Assistant Examiner* — Joseph M Cousins
(74) *Attorney, Agent, or Firm* — Knobbe, Martens, Olson & Bear, LLP

(57) ABSTRACT

A content distribution network is made up of terminals and servers that are connected as a network and cooperate in order to make content or data available to users. In order to be able to control access to the content via certain terminals, a solution called "URL signing" has been discussed. A "URL signing" solution requires establishing an active connection between a terminal requesting content and an originating server associated with the requested content. The solution relates to a method for accessing content implemented by a cache server, thus dispensing with the need for an active connection between a terminal requesting content and the originating server associated with the requested content.

10 Claims, 3 Drawing Sheets

(56) References Cited

U.S. PATENT DOCUMENTS

| | | | | |
|---|---|---|---|---|
| 9,749,301 | B2* | 8/2017 | Vaterlaus | H04L 63/061 |
| 2009/0217301 | A1* | 8/2009 | Grant | H04L 63/102 |
| | | | | 719/320 |
| 2012/0185370 | A1* | 7/2012 | Davie | G06Q 30/04 |
| | | | | 713/176 |
| 2017/0237729 | A1* | 8/2017 | Uppalapati | H04L 63/20 |
| | | | | 726/8 |
| 2018/0159940 | A1* | 6/2018 | Hultkrantz | H04L 67/02 |
| 2021/0400047 | A1* | 12/2021 | Gu | H04L 67/568 |

OTHER PUBLICATIONS

International Search Report for International Application No. PCT/FR2021/051153, dated Oct. 26, 2021.

Van Brandenburg et al., "URI Signing for CDN Interconnection (CDNI) draft-ietf-cdni-uri-singing-19" CDNI URI Signing, Oct. 2019.

Pardue et al., "Hypertext Transfer Protocol (HTTP) over multicast QUIC draft-pardue-quic-http-mcast-00", HTTP over Mcast QUIC, Feb. 2017.

Bryan et al., "JavaScript Object Notation (JSON) Patch", Standards Track, Apr. 2013.

Sheffer et al., "Support for Short-Term, Automatically Renewed (STAR) Certificates in the Automated Certificate Management Environment (ACME)", Internet Engineering Task Force, Mar. 2020.

Sheffer et al., "An ACME Profile for Generating Delegated STAR Certificates draft-ietf-acme-star-delegation-01" ACME STAR Delegation, Aug. 2019.

Bishop et al., "Secondary Certificate Authentication in HTTP/2 draft-ietf-httpbis-http2-secondary-certs-06", Secondary Cert Auth In HTTP/2, May 2020.

Boeyen et al., "Internet X.509 Public Key Infrastructure Certificate and Certificate Revocation List (CRL) Profile", Standards Track, May 2008.

* cited by examiner

METHOD FOR CONTROLLING ACCESS TO CONTENT IMPLEMENTED BY A CACHE SERVER

CROSS-REFERENCE TO RELATED APPLICATIONS

This application is filed under 35 U.S.C. § 371 as the U.S. National Phase of Application No. PCT/FR2021/051153 entitled "METHOD FOR CONTROLLING ACCESS TO CONTENT IMPLEMENTED BY A CACHE SERVER" and filed Jun. 23, 2021, and which claims priority to FR 2006709 filed Jun. 26, 2020, each of which is incorporated by reference in its entirety.

BACKGROUND

Field

The field of the development is that of content delivery to at least one terminal.

More particularly, the development relates to a method for controlling access to content stored in a so-called cache server by at least one terminal.

Description of the Related Technology

A content delivery network (CDN) is made up of terminals and servers that are connected as a network and cooperate in order to make content or data available to users.

Such a content delivery network is made up of: originating servers, from which content is "injected" into the CDN for being replicated therein; peripheral servers, typically deployed in several geographically distinct locations, where content from the originating servers is replicated; a routing mechanism allowing a content access request sent by a user terminal to be served by the "closest" server, in order to optimise the transmission/delivery mechanism.

In order to be able to control access to content via some terminals, a solution called "URL signing" has been discussed within the context of an IETF (Internet Engineering Task Force) working group and formalised in the document URI Signing for CDN Interconnection (CDNI), draft-ietf-cdni-uri-signing-19; by R. van Brandenburg et al.; Oct. 8, 2019; published by the IETF.

FIG. 1 represents a diagram of message exchanges between different terminals contributing to the implementation of such a "URL signing" solution.

The system comprises at least one terminal 10 requesting access to at least one content, such as a web page or a multimedia content, a cache server 11, and at least one originating server 12 whose naming identifier is for example journal.fr, hosting at least one content to be delivered, for example a web page referenced journal.fr/news/week19 and storing data relating to the content requested by the terminal 10 such as data relating to the web page journal.fr/news/week19 or data relating to downloadable content, etc.

The terminal 10 can exchange messages with the cache server 11 and with the originating server 12. A terminal 10 is a piece of equipment that can send requests to obtain content, such as a personal computer, a home gateway, a digital television set-top box, a smartphone, a sensor, etc.

Thus, in a step E1, the terminal 10 sends a request to access content to the originating server 12.

In a step E2, the originating server 12 generates a URI (Uniform Resource Identifier) resource identifier associated with the requested content and the requesting terminal 10. This URI resource identifier comprises additional information for controlling access to this content by the terminal 10, such as, for example, a cryptographic key.

During a step E3, the originating server 12 transmits a message to the terminal 10 comprising the resource identifier generated during step E2.

The receipt of the message transmitted by the originating server 12 during step E3 triggers, in a step E4, a step of transmitting, by the terminal 10, a request for access to the requested content to a cache server 11 in which the requested content is stored. The access request thus transmitted comprises additional information for controlling access to the requested content. Step E4 is equivalent to redirecting a content access request to the originating server to the cache server 11. Indeed, from a protocol point of view, the request to access the content sent by the terminal 10 during step E1 to the authoritative server is redirected to the cache server 11 during step E4. Indeed, although the two requests under consideration have a different content, the second request comprising the additional information for controlling the access to the requested content, they are perceived, from a protocol point of view, as one and the same request relating to the access to a same content by a same terminal 10.

Upon receipt of the content access request comprising the additional information for controlling access to the requested content, the cache server 11 verifies, in a step E5, the authenticity of the content access request by means of the additional information for controlling access to the requested content comprised in the request and by means of information relating to the right of access to the requested content previously provided by the originating server 12 to the cache server 11.

When the authenticity of the content access request is verified, the cache server 11 delivers the content to the terminal 10 during a step E6.

Such a so-called "URL signing" solution requires the availability of the originating server at the time of the request in order for a connection to be established between the terminal 10 and the originating server 12, since the content access request received by the cache server 11 having the requested content corresponds to redirecting the initial access request transmitted by the terminal 10 to the originating server 12.

Because of this restriction, this "URL signing" solution is not very well adapted to the requirements of the 5G standard (or 5th generation standards for mobile telephony), in particular in terms of exchange processing time due to the redirection of the initial access request.

Another drawback of this "URL signing" solution is the increase in load for the domain hosting the originating server of the content when the requested content is required by a large number of users. Indeed, the more content is downloaded, the more the number of content access requests sent to the originating server 12 increases. However, domains hosting originating servers of contents, having delegated the delivery of this content to content delivery networks, are not always sized to handle a substantial load.

There is therefore a need for a content access control technique that does not have all or part of these drawbacks.

SUMMARY

The development meets this need by providing a method for accessing at least one content, said method being implemented by a terminal and comprising:

a first phase comprising the following steps of:
   sending a request for authorisation to access said at least one piece of content to an originating server associated with said content,
   receiving a file comprising at least said authorisation to access said content, the file being delivered by the originating server,
a second phase comprising the following steps of:
   sending a request for access to said content to a so-called cache server in which said content is stored,
   transmitting the file comprising said access authorisation to the cache server,
   receiving the content transmitted by the cache server when the authenticity of the file is verified by the cache server.

Such a method for accessing content implemented by a cache server makes it possible to dispense with the need for a connection between a terminal requesting content and the originating server associated with the requested content. By content, it is meant a specific content or a set of contents located on branches of a same URL (Uniform Resource Locator). For example, a naming identifier journal1.fr/news is common to two contents respectively referenced journal1.fr/news/week19 and journal1.fr/news/week20.

In addition, such a method for accessing content makes it possible to shift the load induced at the domain hosting the originating server associated with this content by an increase in the number of requests for access to a given content to a content delivery network, since the processing of content access requests by the originating server associated with the requested content then the control of the authorisation by the cache server located in a content delivery network are no longer synchronous. Indeed, these two actions can be decorrelated in time.

Indeed, in the present solution, during a first phase, the terminal is provided by an originating server associated with the requested content with a file containing an authorisation to access said content. The providing of this file by the originating server is triggered by the receipt, by the originating server, of a request for authorisation to access a given content. Once the file is provided, it is no longer necessary to maintain a connection between the terminal and the originating server.

During a second phase, which may be implemented subsequently to the first phase or several hours or days later, a user of the terminal actually wishes to actually access the content. For this, the terminal transmits a request for access to the requested content to a cache server, an identifier of which may be provided to the terminal by the originating server, in which the requested content is stored. The cache server then performs access control to the content by means of the file comprising an authorisation to access said content provided by the terminal and received by the latter from the originating server associated with the requested content and when it is verified that the access authorisation is authentic, the cache server delivers the content to the terminal.

In one particular embodiment of the method for accessing content, said file comprises a sequence of messages exchanged between the terminal and the originating server during a communication session established between the terminal and the originating server, at least one of the messages of said sequence of messages comprising said authorisation to access said content.

This makes it possible to increase the reliability level of the verification of the authenticity of the access authorisation of the terminal. Indeed, by having access to the entirety of the exchanges between the terminal and the originating server, the cache server is able to ensure the authenticity and integrity of both.

According to a particular characteristic of the method for accessing content, the content reception step consists in replaying, with said cache server, a sequence of messages exchanged between the cache server and the so-called originating server during a communication session established between the cache server and the originating server during which said content was delivered to the cache server, said sequence of messages having been recorded by said cache server.

By delegating the content delivery to cache servers, it is possible to reduce the costs related to the execution of this content delivery function. Indeed, by delegating the content delivery to a cache server it is possible to reduce the number of connections between communication pieces of equipment in order to deliver contents, in particular by reusing the existing connections between the user pieces of equipment and the cache servers. Such a reduction in the number of connections between communication devices leads to a reduction in the energy consumption of these communication devices.

Unlike known "caching" techniques in which the content itself is stored in at least one cache memory of a cache server, the solution provided is based on storing in the cache server an identical copy of all the messages exchanged between the original server hosting the content and the cache server leading to the delivery of the content to the cache server.

The replay can be carried out to several terminals at the same time in a same so-called IP multicast point-to-multipoint connection as described in the document Hypertext Transfer Protocol (HTTP) over multicast QUIC, draft-pardue-quic-http-mcast-00; by L. Pardue et al.; Feb. 10, 2017 published by the IETF.

Thus, when a terminal wishes to access a given content, the cache server replays with the terminal the sequence of messages previously exchanged between the originating server hosting the content and the cache server that led to the delivery of the content to the cache server. The term replay consists in repeating, by the cache server and with the terminal, the sequence of messages exchanged between the originating server and the cache server when downloading the requested content, the replayed messages being able, if necessary, to be modified to adapt to the context in which they are replayed.

Such a content delivery delegation solution also has increased performance. This is because the number of connections established between communication pieces of equipment in order to deliver content is reduced.

Finally, the content delivery solution provided is reliable. Indeed, within the context of the content delivery method described, a cache server implementing a content delivery is provided with an authorisation to execute this content delivery function which can be verified if necessary.

According to another particular characteristic of the method for accessing content, said access authorisation has a validity duration.

Once the validity duration has expired, the terminal can no longer access the content. This makes it possible to limit the distribution of a given content.

The development also relates to a method for controlling access to content stored in a so-called cache server by at least one terminal, said method being implemented by the cache server and comprising:

a first phase comprising the following step of:
receiving a first file comprising data for controlling access to said content delivered by a so-called originating server associated with said content,
a second phase comprising the following steps of:
receiving a request for access to said content sent by said terminal,
receiving a second file, transmitted by the terminal and comprising at least one authorisation to access said content delivered to said terminal by the originating server,
verifying the authenticity of the second file comprising said authorisation to access said content by means of the first file comprising data for controlling access to said content,
when the authenticity of the second file is verified, delivering the content to said terminal.

According to one particular embodiment of the access control method, the first file further comprises software for processing said second file.

Such software enables the data comprised in the second file to be processed in order to verify the authenticity and integrity of the data.

Such software may be specific to one or more series of particular terminals, for example all the terminals of a certain range of a given manufacturer.

This software may be developed and supplied by a third party, be in the form of an application, etc.

According to another particular embodiment of the access control method, it comprises a step of recording a sequence of messages exchanged between the cache server and the originating server hosting the content during a communication session established with the originating server associated with said content and during which said content is delivered to the cache server.

In one particular implementation of this other embodiment of the access control method, the first file is delivered during said communication session established with the originating server.

This limits the exchanges between the cache server and the originating server, which contributes to increasing performance.

In another particular implementation of this other access control method, the method comprises a step of replaying, with said at least one terminal, the sequence of messages recorded, resulting in the delivery of said content.

In another particular embodiment of the access control method, the second file comprises a sequence of messages exchanged between the terminal and the originating server during a communication session established between the terminal and the originating server, at least one of the messages of said sequence of messages comprising said authorisation to access said content.

The development relates to a so-called cache server capable of controlling access to content stored in the so-called cache server by at least one terminal, the cache server comprising means for:
receiving a first file comprising data for controlling access to said content delivered by a so-called originating server associated with said content,
receiving a request for access to said content sent by said terminal,
receiving a second file, transmitted by the terminal and comprising at least one authorisation to access said content delivered to said terminal by the originating server,
verifying the authenticity of the second file comprising said authorisation to access said content by means of the first file comprising data for controlling access to said content,
when the authenticity of the second file is verified, delivering the content to said terminal.

Another object of the development relates to a terminal requesting access to content, said terminal (10) comprising means for:
receiving a file comprising at least one authorisation to access said content delivered to said terminal by an originating server associated with said content,
sending a request for access to said content to a so-called cache server in which said content is stored,
transmitting the file comprising said access authorisation to the cache server,
receiving the content transmitted by the cache server when the authenticity of the file is verified by the cache server.

The development finally relates to computer program products comprising program code instructions for implementing the methods as described above, when executed by a processor.

The development also relates to a computer-readable recording medium on which computer programs comprising program code instructions for executing the steps of the methods according to the development as described above are stored.

Such a recording medium may be any entity or device capable of storing the programs. For example, the medium may have a storage medium, such as a ROM, for example a CD ROM or a microelectronic circuit ROM, or a magnetic recording medium, for example a USB key or a hard disk.

On the other hand, such a recording medium may be a transmissible medium such as an electrical or optical signal, which may be conveyed via an electrical or optical cable, by radio or by other means, so that the computer programs contained therein are remotely executable. The programs according to the development may in particular be downloaded over a network, for example the Internet.

Alternatively, the recording medium may be an integrated circuit in which the programs are incorporated, the circuit being adapted to execute or to be used in the execution of the aforementioned methods, objects of the development.

BRIEF DESCRIPTION OF THE DRAWINGS

Other purposes, characteristics and advantages of the development will become clearer upon reading the following description, given merely as an illustrative, and non-limiting, example in connection with the figures, among which.

DETAILED DESCRIPTION OF CERTAIN ILLUSTRATIVE EMBODIMENTS

The general principle of the development is based on the delegation of access control usually performed by originating servers hosting contents to be delivered, called originating servers of contents in the following, to cache servers, such as web servers, managed for example by an Internet service provider. Such cache servers implement an "intermediate cache" function and are called in the following cache servers.

Thus, a cache server stores, in at least one of its cache memories, contents transmitted by the originating servers of said contents as well as one or more files associated with these contents and comprising data making it possible to perform the operations for controlling access to these contents in the place of the originating server. When an authorisation for access to content transmitted by a terminal is verified, the cache server transmits this content to a client embedded in the terminal without reconnecting to the originating server of the content identified in a request requiring the providing of the content.

Figure 1:
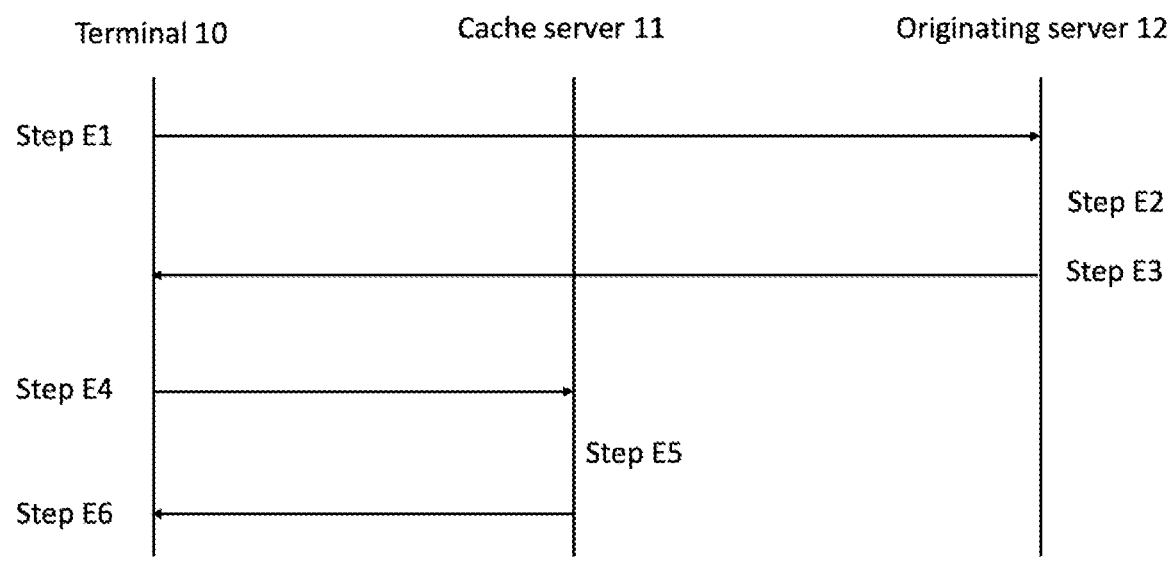
FIG. 1: this figure represents a diagram of message exchanges between different terminals contributing to the implementation of such a "URL signing" solution.
Figure 2:
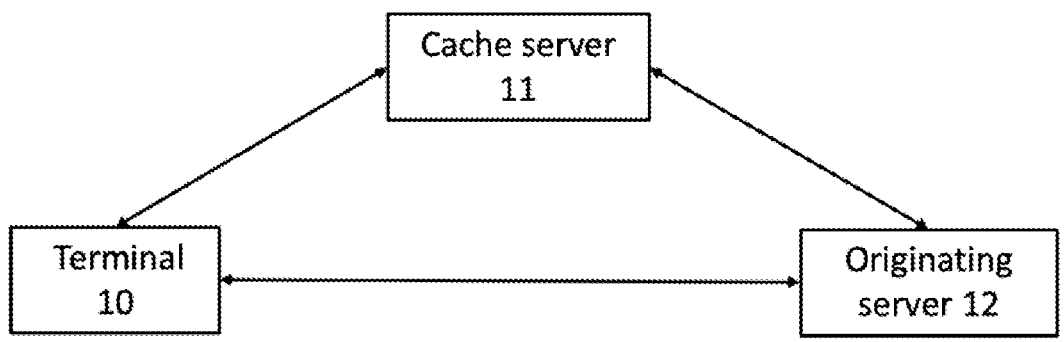
FIG. 2: this figure represents a system in which the methods objects of the development are implemented.

A system in which the methods being objects of the development are implemented is now represented in connection with FIG. 2.

The system comprises at least one terminal 10 requesting access to at least one resource corresponding to a content by means of a URL identifying said resource, such as a web page or a multimedia content, a cache server 11 whose naming identifier is for example orange.fr, and at least one originating server 12 whose naming identifier is for example journal.fr, hosting at least one content to be delivered, such as a web page referenced journal.fr/news/week19 and storing data relating to the content requested by the terminal 10 such as data relating to the web page journal.fr/news/week19 or data relating to downloadable content, etc. For example, this is a newspaper consisting of web pages with different types of contents such as text, images, videos, sound files, 3D animations, etc.

The terminal 10 can exchange messages with the cache server 11 and with the originating server 12. A terminal 10 is a piece of equipment that can send requests to obtain content such as a personal computer, a home gateway, a digital television set-top box, a smartphone, a sensor, etc.

These various exchanges of messages between these different pieces of equipment and their contents are explained in more detail in the following.

Figure 3:
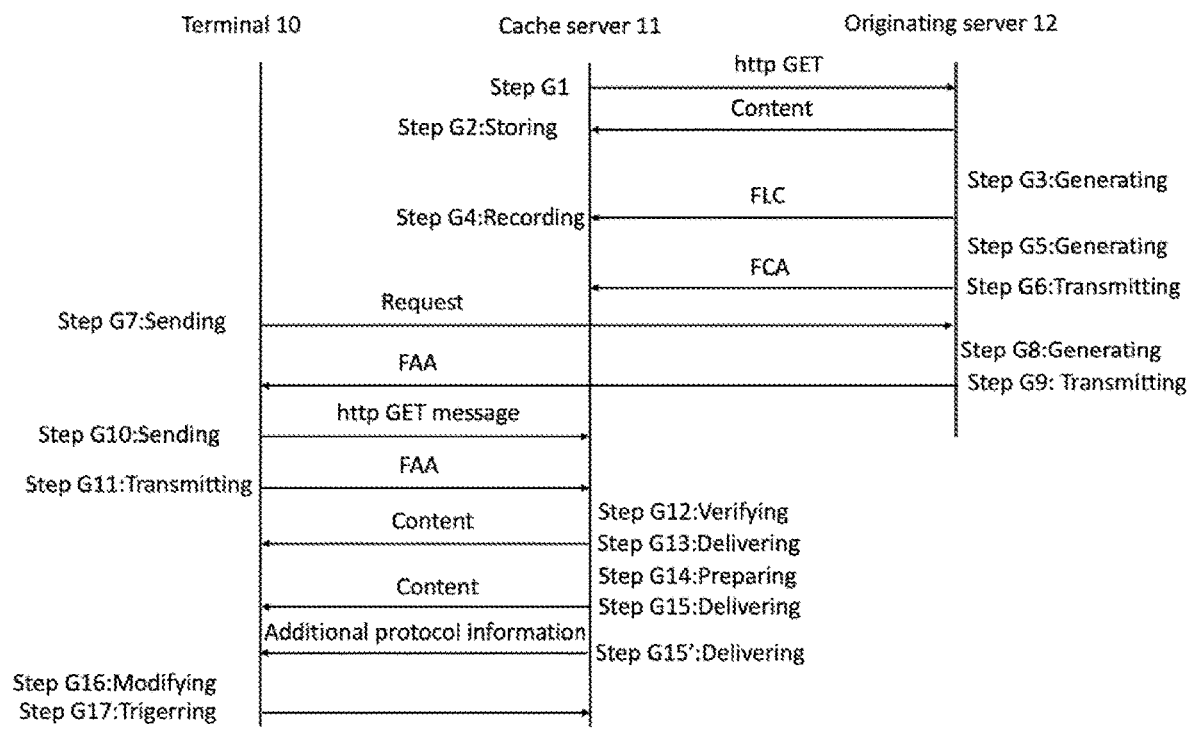
FIG. 3: this figure represents a diagram of exchanges between different communication pieces of equipment involved in the implementation of the methods for accessing at least one content and for controlling access to at least one content.

FIG. 3 shows a diagram of exchanges between different communication pieces of equipment involved in the implementation of the methods for accessing at least one content and for controlling access to at least one content.

In a step G1, the cache server 11 establishes a communication session with the originating server 12 associated with at least one given content during which the content is delivered to the cache server 11.

The sending by the cache server 11 of an http get message triggers the content delivery procedure.

In a first embodiment of the methods objects of the development, in a conventional manner, the content itself is delivered to the cache server 11 by the originating server 12 and stored in at least one cache memory of the cache server 11 during a step G2.

In a second embodiment of the methods objects of the development, unlike known "caching" techniques in which the content itself is stored in at least one cache memory of the cache server 11, the methods objects of the present development are based on the storage in at least one cache memory of the cache server 11 of all the messages exchanged between the originating server 12 and the cache server 11 leading to the delivery of the content to the cache server 11. In this second embodiment, the previously described step G2 is not implemented.

During a step G3, the originating server 12 generates protocol information such as signalling information, as http headers, cookies, access control, etc., and/or control information to be used when delivering the content to a terminal 10, The protocol information generated is for example a list of header fields that can be adapted. Such a JSON PATCH list is for example the following:

[
{ "op": "replace", "path": "user-agent", "value": "w" },
{ "op": "add", "path": "any", "value": "any"}, // the cache can add the fields it wants
]

The protocol information generated may comprise instructions to change the protocol or protocol version used when downloading content between the originating server 12 and the cache server 11 in order to adapt to the protocol used by the terminal 10.

Finally, the protocol information generated may also comprise instructions to change the time spacing between messages to reduce throughput, and indicate these changes in control messages.

The protocol information thus generated by the originating server 12 is then certified by the originating server 12 using cryptographic parameters derived, inter alia, from a private key associated with a public key of the originating server 12. Thus, the integrity of the protocol information thus generated is guaranteed.

In a step G4, the cache server 11 stores, in at least one of its cache memories, all the messages exchanged, or played, with the originating server 12 associated with said content which follow the sending of the http get message in a file of the HARS (http archive secure) type, for example, the so-called content delivery file FLC. The HARS format allows messages to be stored in a so-called "opaque" form, that is, unchanged, or in an interpretable form, or in a mixed form in order to keep the data messages in encrypted form while leaving all or part of the signalling information readable.

All the messages recorded by the cache server 11 comprise messages comprising the protocol information generated and certified by the originating server 12 as well as all the messages conventionally exchanged between the originating server 12 and the cache server 11 when downloading a given content. The messages conventionally exchanged between the originating server 12 and the cache server 11 when downloading a content constitute the primitive form corresponding to the packet flows exchanged when downloading these contents.

An example of the messages exchanged between the originating server 12 and the cache server 11 is represented below:

```
HTTP2_SESSION_INITIALIZED
--> protocol = "h2"
--> source_dependency = 206050 (SOCKET)
HTTP2_SESSION_SEND_SETTINGS
--> settings = ["[id:1 (SETTINGS_HEADER_TABLE_SIZE)
value:65536]"
HTTP2_SESSION_UPDATE_RECV_WINDOW
--> delta = 15663105
--> window_size = 15728640
HTTP2_SESSION_SEND_WINDOW_UPDATE
--> delta = 15663105
--> stream_id = 0
HTTP2_SESSION_SEND_HEADERS
--> exclusive = true
--> end = true
--> has_priority = true
-->:method: POST
:authority: www.youtube.com
:scheme: https
:path: /api/stats/qoe?event=streamingstats&fmt=243&afmt=251
content-length: 0
pragma: no-cache
cache-control: no-cache
sec-fetch-mode: no-cors
origin: https://www.youtube.com
user-agent: Mozilla/5.0 (Windows NT 10.0; Win64; x64)
dnt: 1
content-type: text/plain;charset=UTF-8
accept: */*
x-client-data: CJa2yQEIpLbJAQjBtskBCKmdygEI4qjKAQjt
sec-fetch-site: same-origin
```

At the end of this recording, the messages comprising the protocol information generated and certified by the originating server 12 as well as all the messages conventionally exchanged between the originating server 12 and the cache server 11 when downloading a content are stored in the cache server 11. These messages are stored in a HARS file, the so-called content delivery file FLC, which is itself stored in the cache server 11.

The HARS record format makes it possible to store in a file, or an archive, the different messages carrying the protocol information generated by the originating server 12 and the different data messages exchanged, or played, when downloading the content between the originating server 12 and the cache server 11. Such messages are, for example, compliant with the HTTP2 or QUIC protocols.

In a step G5, the originating server 12 generates an access control file FCA comprising data for controlling access to the resource associated with the given content and identified by a URL. The data comprised in this access control file FCA is either specific to a given terminal 10, or generic and may, for example, apply to a given model of terminal while being specific to the requested content, or generic with respect to the terminal and with respect to the requested content, in the latter case, it then applies to all the resources of the originating server 12.

The access control file FCA may comprise software for processing an access authorisation or a file comprising such an access authorisation. The access control file FCA may also comprise other data such as parameters relating to the volume of content that can be downloaded by a same terminal, an access duration to one or more given contents.

The access control file FCA is a HARS file.

In a step G6, the originating server 12 transmits the access control file FCA to the cache server 11.

In one particular implementation of the first embodiment, the access control file FCA is transmitted to the cache server 11 together with the content during step G2. In this particular implementation of the first embodiment, step G6 is not implemented and step G5 is implemented prior to step G2.

In one particular implementation of the second embodiment, the access control file FCA is transmitted by the originating server during the same series of message exchange that leads to the delivery of the content during step G4. In this particular implementation of the second embodiment, the cache server 11 stores, in at least one of its cache memories, all the messages exchanged, or played, with the originating server 12 and relating to the delivery of the content in a HARS type file, the so-called content delivery file FLC, as well as the access control file FCA. The content delivery file FLC and the access control file FCA are two separate files. In this particular implementation of the second embodiment, step G6 is not implemented and step G5 is implemented prior to step G4. Step G5 may be implemented before, after or concurrently with step G3.

At the end of steps G2, G4 or G6, depending on the implementation implemented, the cache server 11 has the required content comprised in the content delivery file FLC and the content access control file FCA.

In one particular embodiment, the content delivery file FLC and the access control file FCA are recorded by the cache server 11 in a common HARS file, for example in two distinct streams of the HTTP2 or QUIC protocols. In this particular embodiment, the originating server 12 transmits, during exchanges with the cache server 11, JSON PATCH instructions, as defined for example in the document JavaScript Object Notation (JSON) Patch; by P. Bryan et al.; April 2013 published by the IETF and described below, so that the cache server 11 removes the data constituting the access control file FCA at the time of delivery of the content to the terminal 10:

```
[
{ "op": "remove", "path": "/FCA/*" }, // request to delete the delivery
of FCA control parameters
]
```

Steps G1 to G6 do not directly trigger steps G7 and the following steps, but have to precede the same in order to ensure the proper execution of the methods for controlling access to content and for accessing content.

In a step G7, the terminal 10, a user of which wishes to access a given content, sends a message, for example of the http GET type comprising the URL of a resource associated with the requested content, to the originating server 12 associated with the required content. Such a message comprises at least an identifier of the originating server 12 and an identifier of the requested content.

During a step G8, the originating server 12 generates an authorisation to access the required content in response to receiving the http GET message.

The access authorisation generated by the originating server 12 is, for example, comprised in a file, the so-called access authorisation file FAA. Such an access authorisation file FAA is a HARS file comprising all the messages as they have been exchanged between the terminal 10 and the originating server 12 associated with said content, starting from the sending of the request for authorisation to access the resource associated with the requested content sent by the terminal 10 during step G7.

In a first implementation, the sending of the request for authorisation to access the resource associated with the requested content is an http GET URL message sent by the terminal 10 during step G7. The access authorisation file FAA then comprises the http GET URL message sent by the terminal 10 and an http 200 OK message sent by the originating server 12. The http 200 OK message sent by the originating server 12 constitutes a proof that the originating server 12 authorises the terminal 10 to access the required content.

In this first implementation, the originating server 12 may also transmit, among these exchanges, messages comprising identifiers, such as Internet Protocol (IP) addresses, of cache servers 11 that have the required content.

These identifiers of cache servers 11 may be comprised in a header of an alternate service message such as defined in RFC7838 (Request For Comment) published by the IETF:
Alt-Svc: h2="FQDN_A:8000";
Alt-Svc: wpack="192.168.1.1:8000";
where FQDN_A is a cache server 11 in which the required content is stored.

These identifiers of cache servers 11 can be transmitted by distributing information relating to domain name resolution DNS from a domain name server or independent DNS server or from the originating server 12 performed according to the DoH resolverless protocol. This information relating to DNS name resolution points directly to an IP address, for example here an IPv4 type address, of the cache server 11 FQDB_A: for example, 'A FQDN_B 192.168.1.1:8000'.

These identifiers of cache servers 11 can be further transmitted by distributing information relating to a so-called redirect DNS resolution performed according to the DoH resolverless protocol taking for example the form 'CNAME FQDN_B FQDN_A', where FQDN_B is the originating server 12.

In a second implementation, the originating server 12 behaves as an ACME STAR (Automatic Certificate Management Environment) server, these two ACME and STAR protocols being defined in the IETF publications Support for Short-Term, Automatically Renewed (STAR) Certificates in the Automated Certificate Management Environment (ACME); by Y. Sheffer et al.; March 2020 and An ACME Profile for Generating Delegated STAR Certificates draft-ietf-acme-star-delegation-01; by Y. Sheffer et al.; Aug. 26, 2019, respectively.

In a known way, the ACME protocol is used to generate X509 certificates signed by a certification authority. Typically, such certificates are delivered to one or more cache servers 11 in order to delegate some functions of an originating server 12 thereto.

In particular, the ACME protocol is used to automatically generate certificates for web servers in order to facilitate the migration from HTTP protocol to HTTPS protocol. The STAR extension of the ACME protocol defined in document RFC 8739 published by the IETF allows the automatic renewal of these certificates and thus the generation of certificates with a short validity duration.

In this conventional implementation of the ACME protocol, authentication of the originating server 12 to the terminal 10 is achieved using Transport Layer Security (TLS) protocol compliant messages such as the ServerHello message, or when QUIC protocol compliant messages are used, the SHO message. Authentication of the terminal 10 to the originating server 12 is performed using an application protocol such as FTP, FTTP, HTTP2, HTTP3, TCP, SCTP, TLS or QUIC protocols located above the transport layer.

In this second implementation, it is provided to define a new extension to the HTTP2 protocol named WINS_US_STAR which is based on the ACME protocol as defined in document RFC 8739 published by the IETF as well as the HTTP2 extension defined in document Secondary Certificate Authentication in HTTP/2 draft-ietf-httpbis-http2-secondary-certs-06; by M. Bishop et al.; May 14, 2020 also published by the IETF.

In this new HTTP2 protocol extension, a certificate CERT_CLIENT_STAR is a temporary certificate similar to a certificate created using ACME protocols with a limited validity duration.

Thus, in this second implementation, the originating server 12 provides a temporary certificate to the terminal 10 that authorises the terminal to access the resource associated with the requested content. The temporary certificate provided by the originating server to the terminal 10 is derived from a certificate CERT_CLIENT specific to the terminal 10.

In a step G7, the terminal 10 establishes a https type secure connection with the originating server 12 in accordance with the HTTP2 protocol. During these exchanges, the terminal 10 informs the originating server 12 that it supports the WINS_US_STAR extension of the HTTP2 protocol.

During this step G7, the terminal 10 generates a cryptographic key pair comprising a private key WINS_US_PRI and a public key WINS_US_PUB associated with the certificate CERT_CLIENT of the terminal 10.

The terminal 10 calculates proofs of ownership named WINS_US_CHALLENGE1 and WINS_US_CHALLENGE2 respectively of the private key WINS_US_PRI and the private key WINS_US_PRI by encrypting the URL identifying the resource associated with the requested content using these two cryptographic keys.

Terminal 10 then gathers the proofs of ownership WINS_US_CHALLENGE 1 and WINS_US_CHALLENGE 2, the public key WINS_US_PUB and other parameters for creating certificates into a new message called WINS_US_CSR. WINS_US_CSR is the equivalent of the Certificate Signing Request (CSR) message in the ACME protocol.

When establishing the HTTP2 connection with the originating server 12, during step G7, the terminal 10 transmits a request for access to the resource FQDN_B/sth/app comprising:
a WINS_US=TRUE parameter indicating that it supports the extension WIN_US_STAR;
the request http GET URL FQDN_B/sth/app;
the certificate CERT_CLIENT of the terminal 10;
a request for a temporary certificate authorising access to the resource associated with the requested content.

In a step G8, the originating server 12 receives a request for access to the resource FQDN_B/sth/app sent by the terminal 10.

The originating server 12 detects the presence of the field WINS_US=TRUE which indicates that the terminal 10 supports the extension WIN_US.

The originating server 12 then identifies the required resource and verifies the rights of the terminal 10 of access to this resource and to the content with which it is associated.

The originating server 12 then verifies that decrypting the proofs of ownership WINS_US_CHALLENGE 1 and WINS_US_CHALLENGE 2 using the public key WINS_US_PUB yields the URL FQDN_B/sth/app identifying the requested resource.

Once these verifications are performed, the originating server 12 generates a certificate CERT_CLIENT_STAR from the certificate CERT_CLIENT of the terminal 10. The originating server 12 includes, in a SAN field (Internet X.509 Public Key Infrastructure Certificate and Certificate Revocation List (CRL) Profile; by D. Cooper et al.; May 2008) of the certificate CERT_CLIENT_STAR, at least the URL identifying the resource associated with the requested content such as for example: FQDN_B/sth/app where FQDN_B corresponds to the originating server 12 and where/sth/app is the required resource, as well as other parameters such as parameters relating to the volume of content that can be downloaded by the terminal 10 or to the validity duration of the certificate CERT_CLIENT_STAR.

In a step G9, the originating server 12 transmits the access authorisation file FAA to the terminal 10 which stores it in one of its memories for later use. In the second implementation, the file FAA is made up of the certificate CERT_CLIENT_STAR In a step G10, which may be implemented a few moments, hours or days later after the implementation of step G9, the terminal 10 sends a message, such as an http GET message comprising the URL of the resource FQDN_B/sth/app identifying the resource associated with the requested content to the cache server 11 indicated in the access authorisation file FAA. Such a message comprises the URL associated with the required content FQDN_B/sth/app.

During a step G11, which may be concurrent with or subsequent to step G10, the terminal 10 transmits the access authorisation file FAA to the cache server 11.

In a step G12, the cache server 11 then proceeds to verify the authenticity and integrity of the access authorisation file FAA by means of the access control file FCA.

Thus, the cache server 11 executes the software comprised in the access control file FCA in order to access the data comprised in the access authorisation file FAA.

The processing of the data comprised in the access authorisation file FAA performed during the execution of the software comprised in the access control file FCA verifies the authenticity and integrity of the data comprised in the access authorisation file FAA and thus the authorisation to access the required content.

For example, in the first implementation, the software extracts from the access authorisation file the URL FQDN_B/sth/app as well as the http 200 OK message sent by the originating server 12 which constitutes the authorisation to access the required content. The software also verifies if the validity duration of the access authorisation has expired and/or if the volume limit of downloaded data has been reached. Thus, the file FCA contains parameters for encrypting the session for recording the files FAA. The cache server 11 can then read the file FAA and analyse the exchanges contained therein to extract the URL of the resource associated with the requested content and in parallel search if the content is stored in one of its memories, or extract the response from the origin (200 OK).

In the second implementation, the software provided by the originating server 12 during step G5 extracts the certificate CERT_CLIENT_STAR and the URL FQDN_B/sth/app from the access authorisation file FAA. The software also verifies if the access authorisation validity duration has expired and/or if the download volume limit has been reached. The software provided is not specific to the originating server 12, it makes it possible, when executed, to verify that the CERT_CLIENT_STAR is valid and is correctly signed by the originating server 12 using a public key of a certificate of the originating server 12 obtained in steps G2 or G4.

Verification of the authenticity and integrity of the file FAA by the cache server 11 triggers, in the first embodiment, the delivery of the content to the terminal 10 by means of conventional content delivery techniques in a step G13.

In the second embodiment, the verification of the authenticity and integrity of the access authorisation file FAA by the cache server 11 triggers the replay of the content delivery file FLC stored in the cache server 11 and associated with the requested content.

In a first alternative of the methods objects of the development, the modifications to be applied to some messages of the content delivery file FLC are performed at the cache server 11. The modifications to be applied to some messages of the content delivery file FLC consist in modifying some parameters of the messages stored in the content delivery file FLC as a function of the protocol information generated by the originating server 12 and also stored in the content delivery file FLC.

In a first implementation of this first alternative, during a step G14, the cache server 11 prepares the replay of the content delivery file FLC associated with the content with the terminal 10 in order to deliver the requested content to the terminal 10.

For this, the cache server 11 modifies some of the messages stored in the content delivery file FLC associated with the requested content in order to adapt them to the sending/receiving points, that is, the cache server 11 and the terminal 10, if they are different from those of the initial set of messages, that is, if they are different from the messages exchanged between the originating server 12 and the cache server 11 when downloading the requested content. For this, the cache server 11 makes these modifications on the basis of protocol information generated by the originating server 12. The term modification of messages stored in the content delivery file FLC covers the addition, the deletion of messages or the modification of some parameters relating to the messages. Such a list of value modifications is for example:

user-agent: Mozilla/5.0 x-nginx-cache-version: 8.4.1

Once the content delivery file FLC associated with the content is ready, the cache server 11 triggers, in a step G15, the replay of the messages stored in the content delivery file FLC and modified during step G14.

In a second implementation of this first alternative, the cache server 11 modifies some of the messages stored in the content delivery file FLC associated with the requested content in order to adapt them to the sending/receiving points, when replaying these messages. Thus, in this second implementation of this first alternative, the messages that are to be modified are modified gradually.

As in the first implementation, the modification of messages is performed based on the protocol information generated by the originating server 12. Regardless of the implementation, modifications to some messages of the content delivery file FLC may also change the protocol used when downloading content between the originating server 12 and the cache server 11 in order to adapt to the terminal 10. These changes are then indicated in the control messages inserted by the cache server 11. Thus, for example, the http get messages stored in the content delivery file FLC are replaced by push http2 type messages, etc.

Modifications to some messages of the content delivery file FLC may also change the time spacing between messages to reduce throughput, and indicate these changes in the control messages.

At the end of the replay of all the messages stored in the content delivery file FLC and modified during step G14, the requested content is delivered to the terminal 10.

At the end of the replay of all the messages stored in the content delivery file FLC, the terminal 10 also has the protocol information generated by the originating server 12 which can be used to verify the integrity of the data transmitted by the cache server 11.

In a second alternative of the methods objects of the development, the modifications to be applied to some messages of the content delivery file FLC are performed at the terminal 10. The terminal 10 modifies some parameters of the messages stored in the content delivery file FLC that has been transmitted to the terminal 10 as a function of the protocol information generated by the originating server 12, and itself comprised in the content delivery file FLC transmitted. In this second alternative, the terminal 10 may use additional protocol information to modify some messages comprised in the content delivery file FLC. Such additional protocol information is not comprised in the content delivery file FLC, it is transmitted separately to the terminal 10 by the cache server 11 in a step G15'. This is because, in this case, the protocol information comprised in the content delivery file FLC relates to the identity of the messages to be modified for replay, and the additional protocol information relates to the values to be applied to the messages identified in the protocol information during modification thereof. The additional protocol information is generated by the cache server 11 as a function of information received from the terminal 10. Thus, while the protocol information may be common to several terminals, the additional protocol information is specific to the terminal 10.

In a first implementation of this second alternative, during a step G16, the terminal 10 modifies, creates or deletes header field values of some messages initially exchanged between the originating server 12 and the cache server 11 for replaying, between the cache server 11 and the terminal 10, the sequence of messages recorded during step G4. The list of header field values that can be modified is for example:

[
{ "op": "replace", "path": "user-agent", "value": "Mozilla/5.0 (Linux; Android 7.0; SM-G892A Build/NRD90M; wv) AppleWebKit/537.36 (KHTML, like Gecko) Version/4.0 Chrome/60.0.3112.107 Mobile Safari/537.36" },
{ "op": "add", "path": "/x-nginx-cache-version", "value": "8.4.1"},
]

Once the content delivery file FLC associated with the content is ready, the terminal 10 triggers, in a step G17, the replay of the messages stored in the content delivery file FLC and modified during step G16.

In a second implementation of this second alternative, the terminal 10 modifies some of the messages stored in the content delivery file FLC associated with the requested content in order to adapt them to the sending/receiving points, when replaying these messages. Thus, in this second implementation of this second alternative, the messages that are to be modified are modified gradually.

As in the first implementation, the modification of messages is performed based on the protocol information generated by the originating server 12.

Regardless of the implementation, modifications to some messages of the content delivery file FLC may also change the protocol used when downloading the content between the originating server 12 and the cache server 11 in order to adapt to the terminal 10. These changes are then indicated in the control messages inserted by the terminal 10. Thus, for example, the http get messages stored in the HARS file are replaced by push http2 type messages, etc.

The terminal 10 can also change the time spacing between messages to reduce throughput, and indicate these changes in the control messages.

In both the first and second alternatives, the terminal 10 has a version of the protocol information certified by the originating server 12, so the terminal 10 can verify, by means of the cryptographic keys received, that the modifications made by the cache server 11 or the terminal 10 comply with the instructions of the originating server 12.

At the end of the replay of the messages stored in the content delivery file FLC and modified during step G16, the requested content is delivered to the terminal 10.

Figure 4:
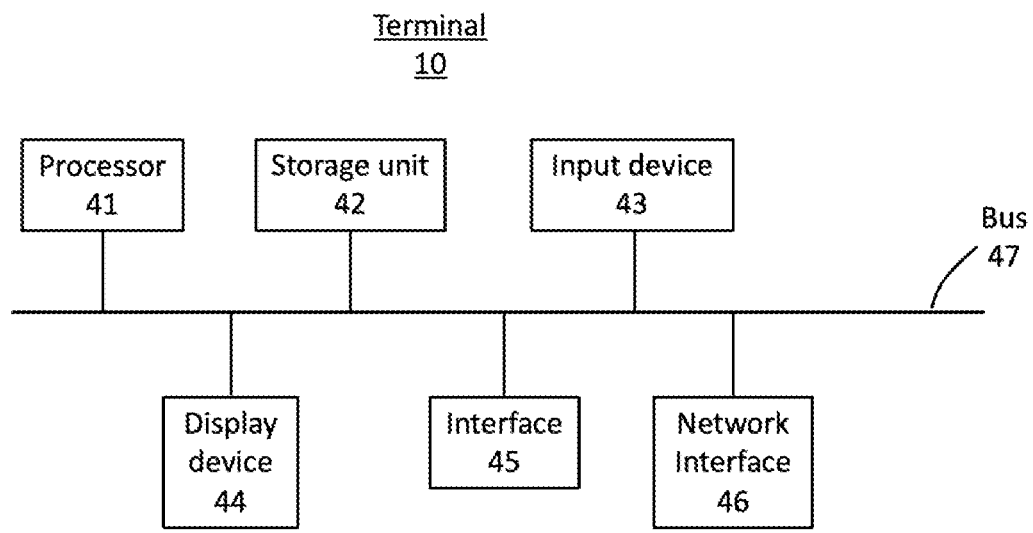
FIG. 4: this figure represents a terminal capable of implementing the different embodiments of the method for accessing at least one content according to FIG. 3, FIG. 5: this figure represents a cache server capable of implementing the different embodiments of the method for controlling access to content according to FIG. 3.

FIG. 4 represents a terminal 10 according to an embodiment of the development. Such a terminal 10 is capable of implementing the various embodiments of the method for accessing at least one content according to FIG. 3.

A terminal 10 may comprise at least one hardware processor 41, a storage unit 42, an input device 43, a display device 44, an interface 45, and at least one network interface 46 which are connected to each other through a bus 47. Of course, the constituent elements of the terminal 10 may be connected by means of a connection other than a bus.

The processor 41 controls the operations of the terminal 10. The storage unit 42 stores at least one program for implementing the method according to an embodiment of the development to be executed by the processor 41, and various data, such as parameters used for calculations performed by the processor 41, intermediate data of calculations performed by the processor 41, etc. The processor 41 may be formed by any known and appropriate hardware or software, or by a combination of hardware and software. For example, the processor 41 may be formed by dedicated hardware such as a processing circuit, or by a programmable processing unit such as a central processing unit which executes a program stored in a memory thereof.

The storage unit 42 may be formed by any appropriate means capable of storing the program or programs and data in a computer readable manner. Examples of the storage unit 42 comprise non-transitory computer-readable storage media such as solid-state memory devices, and magnetic, optical or magneto-optical recording media loaded into a read/write unit.

The input device 43 may be formed by a keyboard, a pointing device such as a mouse to be used by a user to enter commands. The display device 34 may also be formed by a display module, such as a Graphical User Interface (GUI).

The interface 45 provides an interface between the terminal 10 and another piece of equipment.

At least one network interface 46 provides a connection between the terminal 10 and the cache server 11, and the originating server 12.

Figure 5:
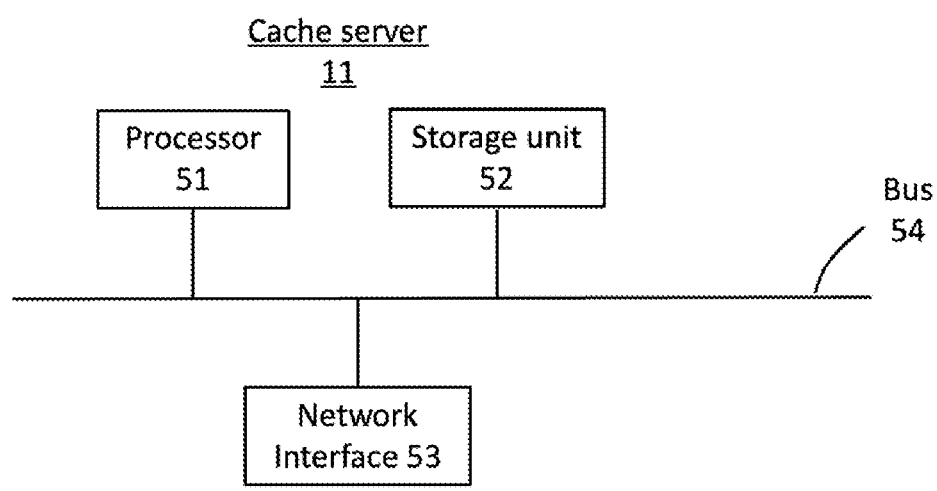

FIG. 5 represents a cache server 11 capable of implementing the various embodiments of the method for controlling access to content according to FIG. 3.

A cache server 11 may comprise at least one hardware processor 51, a storage unit 52, and at least one network interface 53 which are connected to each other through a bus 54. Of course, the constituent elements of the cache server 11 may be connected by means of a connection other than a bus.

The processor 51 controls the operations of the cache server 11. The storage unit 52 stores at least one program for implementing the method according to an embodiment to be executed by the processor 51, and various data, such as parameters used for calculations performed by the processor 51, intermediate data of calculations performed by the processor 51, etc. The processor 51 may be formed by any known and appropriate hardware or software, or by a combination of hardware and software. For example, the processor 51 may be formed by dedicated hardware such as a processing circuit, or by a programmable processing unit such as a central processing unit which executes a program stored in a memory thereof.

The storage unit 52 may be formed by any suitable means capable of storing the program or programs and data in a computer readable manner. Examples of the storage unit 52 comprise non-transitory computer-readable storage media such as solid-state memory devices, and magnetic, optical or magneto-optical recording media loaded into a read/write unit.

At least one network interface 53 provides a connection between the cache server 11, the terminal 10 and the originating server 12.

The invention claimed is:

1. A method for accessing content, the method being implemented by a terminal and comprising:
   a first phase comprising:
     sending a request for authorization to access the content to an originating server associated with the content;
     receiving a file comprising a sequence of messages exchanged between the terminal and the originating server during a communication session established between the terminal and the originating server, at least one of the messages of the sequence of messages comprising at least one authorization to access the content delivered to the terminal by the originating server;
   a second phase comprising:
     sending a request for access to the content to a cache server in which the content is stored;
     transmitting the file comprising the access authorization to the cache server; and
     receiving the content transmitted by the cache server, the receiving being representative of a positive verification of the access authorization.

2. The method for accessing content according to claim 1, wherein receiving the content comprises replaying, with the cache server, a sequence of messages exchanged between the cache server and the originating server during a communication session established between the cache server and the originating server during which the content is delivered to the cache server, the sequence of messages having been recorded by the cache server.

3. The method for accessing content according to claim 1, wherein the access authorization has a validity duration.

4. A terminal for accessing content, the terminal comprising at least one hardware processor, a storage unit, an input device, a display device, an interface, and at least one network interface which are connected to each other through a bus, the processor being configured to perform the following:
   sending a request for authorization to access the content to an originating server associated with the content;
   receiving a file comprising a sequence of messages exchanged between the terminal and the originating server during a communication session established between the terminal and the originating server, at least one of the messages of the sequence of messages comprising at least one authorization to access the content delivered to the terminal by an originating server associated with the content;
   sending a request for access to the content to a cache server in which the content is stored;
   transmitting the file comprising the access authorization to the cache server; and
   receiving the content transmitted by the cache server, the receiving being representative of a positive verification of the access authorization.

5. A method for controlling access to content stored in a cache server by at least one terminal, the method being implemented by the cache server and comprising:
   a first phase comprising:
     receiving a first file comprising data for controlling access to the content delivered by an originating server associated with the content;
   a second phase comprising:
     receiving a request for access to the content sent by the terminal;
     receiving a second file, transmitted by the terminal and comprising a sequence of messages exchanged between the terminal and the originating server during a communication session established between the terminal and the originating server, at least one of the messages of the sequence of messages comprising at least one authorization to access the content delivered to the terminal by the originating server;
     verifying an authenticity of the second file comprising the authorization to access the content using the first file comprising data for controlling access to the content; and
     when the authenticity of the second file is verified, delivering the content to the terminal.

6. The method for controlling access to content according to claim 5, wherein the first file further comprises software for processing the second file, such software enabling the data comprised in the second file to be processed in order to verify the authenticity and integrity of the data.

7. The method for controlling access to content according to claim 5, comprising recording a sequence of messages exchanged between the cache server and the originating server hosting the content during a communication session established with the originating server associated with the content and during which the content is delivered to the cache server.

8. The method for controlling access to content according to claim 7, wherein the first file is delivered during the communication session established with the originating server.

9. The method for controlling access to content according to claim 7, comprising replaying, with the at least one terminal, the sequence of messages recorded, resulting in the delivery of the content.

10. A cache server capable of controlling an access to content stored in the cache server by at least one terminal, the cache server comprising at least one hardware processor, a storage unit, and at least one network interface which are connected to each other through a bus, the processor being configured to perform the following:
    receiving a first file comprising data for controlling access to the content delivered by an originating server associated with the content;
    receiving a request for access to the content sent by the terminal;
    receiving a second file, transmitted by the terminal and comprising a sequence of messages exchanged between the terminal and the originating server during a communication session established between the terminal and the originating server, at least one of the messages of the sequence of messages comprising at least one authorization to access the content delivered to the terminal by the originating server;

verifying an authenticity of the second file comprising the authorization to access the content using the first file comprising data for controlling access to the content; and when the authenticity of the second file is verified, delivering the contents to the terminal.

* * * * *